(No Model.)
C. G. MOOR.
PROCESS OF MAKING FERTILIZER FROM SEWAGE SLUDGE.
No. 442,490. Patented Dec. 9, 1890.
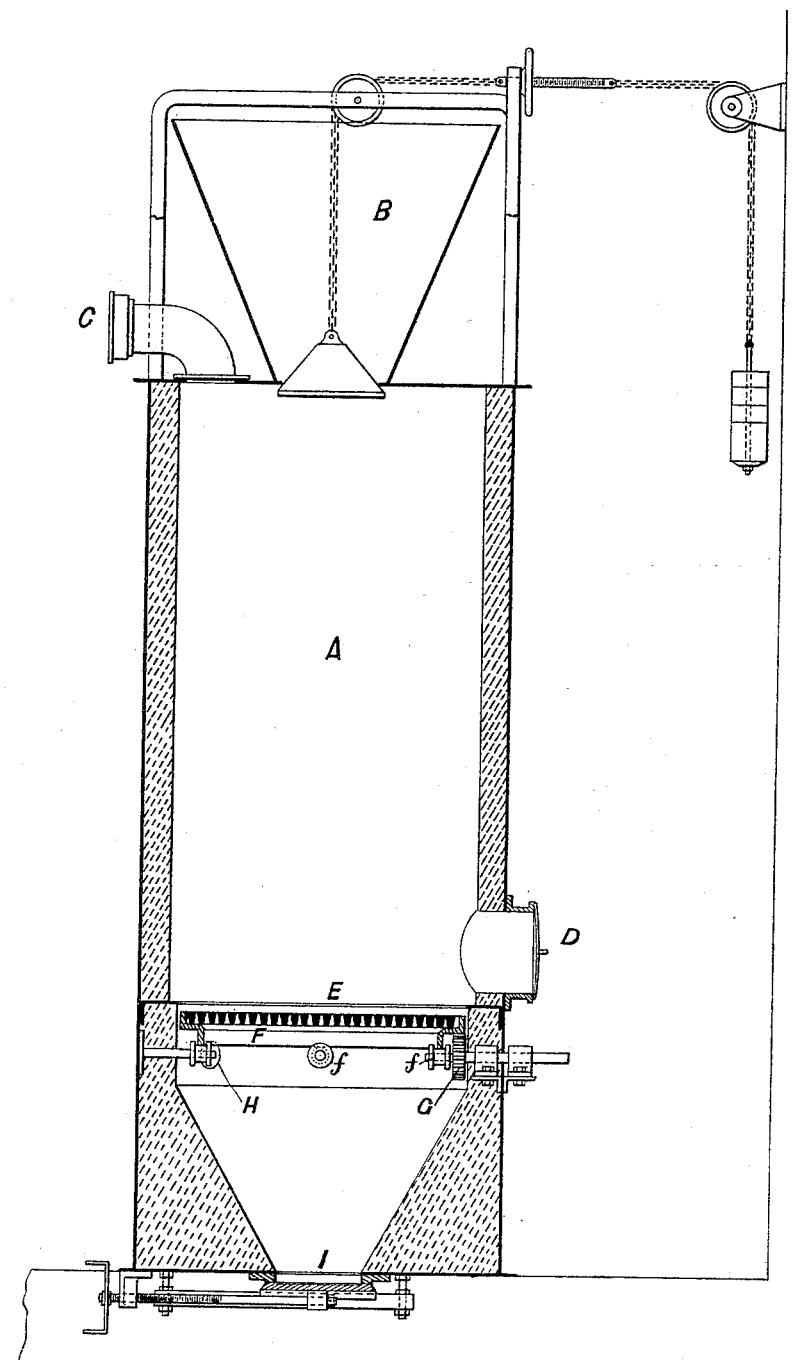
Witnesses:
C. Sedgwick
E. M. Clark
Inventor
C. G. Moor
by Munn & Co.
Attorneys.

UNITED STATES PATENT OFFICE.

CRESACRE GEORGE MOOR, OF TRURO, ENGLAND.

PROCESS OF MAKING FERTILIZER FROM SEWAGE-SLUDGE.

SPECIFICATION forming part of Letters Patent No. 442,490, dated December 9, 1890.

Application filed April 1, 1890. Serial No. 346,354. (No specimens.)

*To all whom it may concern:*

Be it known that I, CRESACRE GEORGE MOOR, gentleman, of St. Clement's Vicarage, Truro, in the county of Cornwall, England, have invented new and useful Improvements in the Treatment of Sewage for the Purification Thereof and the Production of a Valuable Product Therefrom, of which the following is a full, clear, and exact description.

My invention relates to the treatment of sewage for the purification thereof and the production therefrom of a marketable manure consisting essentially of phosphates and ammonia.

For convenience of description my process may be divided into two stages: first, the precipitation of the matters in suspension in the form of sludge and the purification of the effluent water; second, the distillation, carbonization, and calcination of the sludge.

It is an essential object of this invention to avoid the addition of anything to the sewage which cannot be afterward eliminated from the sludge, or which will not add to its fertilizing properties by increasing the proportion of phosphoric acid or of ammonia contained therein. For this, and also for economical reasons, I use as the precipitating agent a portion of the sewage-sludge itself after carbonization in the second stage of the process, the carbonized sludge being for this purpose mixed with sulphate of magnesia.

In carrying out the operation the sewage may be first passed through strainers to remove gross solid matters in suspension other than sewage, and then run into settling-tanks, where the precipitating agent, consisting of carbonized sludge and sulphate of magnesia, is added. The sludge is then allowed to settle and the precipitate will contain ammonio-magnesium phosphate. After precipitation the supernatant water is decanted off and passed through a filter-bed, which for economical reasons I make of the carbonized sludge obtained, as hereinafter described, in the second stage of the process, whereby the water is both filtered and disinfected or purified, the effluent from the filter-bed being sufficiently innoxious to be run into rivers without injury to fish.

The second stage of the process relates to the distillation, carbonization, and calcination of the sludge precipitated in the first operation and that left upon the filter-bed by the effluent water. For this purpose the sludge is first dried until it contains only about twenty-five per cent of water. This may be done either by pumping it onto another porous filter-bed (made, preferably, of carbonized sludge) and allowing it to drain and dry in the air, or by pressing it in a filter-press, (the effluent in either case being added to the raw sewage running into the precipitating-tank,) and the dried sludge, cut or pressed into blocks, being then charged into a furnace somewhat resembling a blast-furnace or a lime-kiln and provided with a forced draft. The furnace would have a grating near the bottom and be provided with facilities for the removal from below the grating of the ash resulting from the calcination of the sludge, and for the removal from above the grating of part of the carbonized sludge before calcination. The upper part of the furnace is in communication with a condensing apparatus, where the ammonia and tarry matters distilled off from the charge are collected. The charge lying upon the grating having been ignited, a forced draft is maintained through the furnace either by a blast of air introduced below the grating or by an exhauster in connection with the condenser. In this furnace the distillation of the charge of sludge is effected by the heat developed by the combustion of the previously-charged sludge at the lower part of the furnace, the operation, which is conducted much in the same way as that of lime-burning, being carried on continuously by introducing a fresh charge at top as often as required and removing the ash at the bottom and also withdrawing a part of the carbonized but unconsumed sludge for filtering purposes, as above mentioned. In this process each successive charge of sludge-cake passes gradually through all the grades of temperature, from that of the atmosphere to a red heat, before being finally burned, and a considerable flow of gases passing through the furnace at a temperature much below that at which ammonia is destroyed. The ammonia is of necessity carried forward without becoming decomposed.

A suitable condenser for collecting the ammonia and tarry matters would be a range of iron pipes running around the building in which the blocks of sludge are dried or s ored in wet weather, so that the heat abstracted from the condensable matters distilled off from the sludge may be utilized for drying purposes.

In some cases the distillation of the charge yields a combustible gas, which passes off uncondensed and may used for heating purposes on the works.

By the above-described distillation and calcination all organic matters and water have been removed and the manurial constituents of the sludge have been concentrated without loss, for if the weight of the ash be, say, one-fourth that of the sludge from which it was obtained it will contain four times as much phosphoric acid and potash salts as were contained in an equal weight of sludge. The nitrogen which was contained in the sludge in an insoluble state has now been converted into ammonia, which, being soluble, is readily assimilated by plants. The ash will now consist, mainly, of silica (road-sand) and calcium phosphate, together with, in smaller quantities, oxide of iron, alumina, magnesia, soda, and potash salts. As regards the potash salts, it is well known that the greater proportion of the potash salts in sewage is already in solution and cannot be arrested by any precipitant. A certain amount of potash is, however, contained by vegetable matters in suspension, and this will be obtained in a serviceable form in the ash. The ash is then mixed with sulphate of ammonia obtained by treating the ammonia-liquor in the manner ordinarily practiced in gas-works.

The accompanying drawing illustrates in central vertical section the form of furnace which I prefer to employ.

The furnace A has a charging-mouth B, closed by a counterbalanced cone, and an outlet C for the gases leading to the condenser. The furnace has a man-hole and door D just above a revolving grating E, formed of loose bars lying in a ring-frame F, supported on rollers $f$ and toothed to engage with a pinion G, turned by an outside handle. Below the grating is a blast-inlet H, fitted with a valve. The ash-pit is hopper-shaped and closed at bottom by a sliding door I, worked by a screw, for withdrawing the ash.

Having now particularly described and ascertained the nature of the said invention and in what manner the same is to be performed, I declare that what I claim is—

The herein-described process of treating sludge obtained from sewage by the use of sulphate of magnesia as a precipitant, which consists in compressing the sludge, feeding successive charges of the compressed sludge to a furnace having a forced draft, removing from time to time part of the sludge when carbonized, calcining the remainder, removing the ash from time to time, and finally mixing sulphate of ammonia with the ash to form a manure, substantially as set forth.

The foregoing specification of my improvements in the treatment of sewage for the purification thereof and the production of a valuable product therefrom signed by me this 13th day of March, 1890.

CRESACRE GEORGE MOOR.

Witnesses:
WM. CLARK,
Patent Agent, 53 Chancery Lane, London.
I. N. KENNARD,
Clerk, 53 Chancery Lane, London.